2,989,349
PNEUMATIC DELIVERY AND TIME-CONTROLLED MEASURING OF FINE MATERIAL SUCH AS POWDER

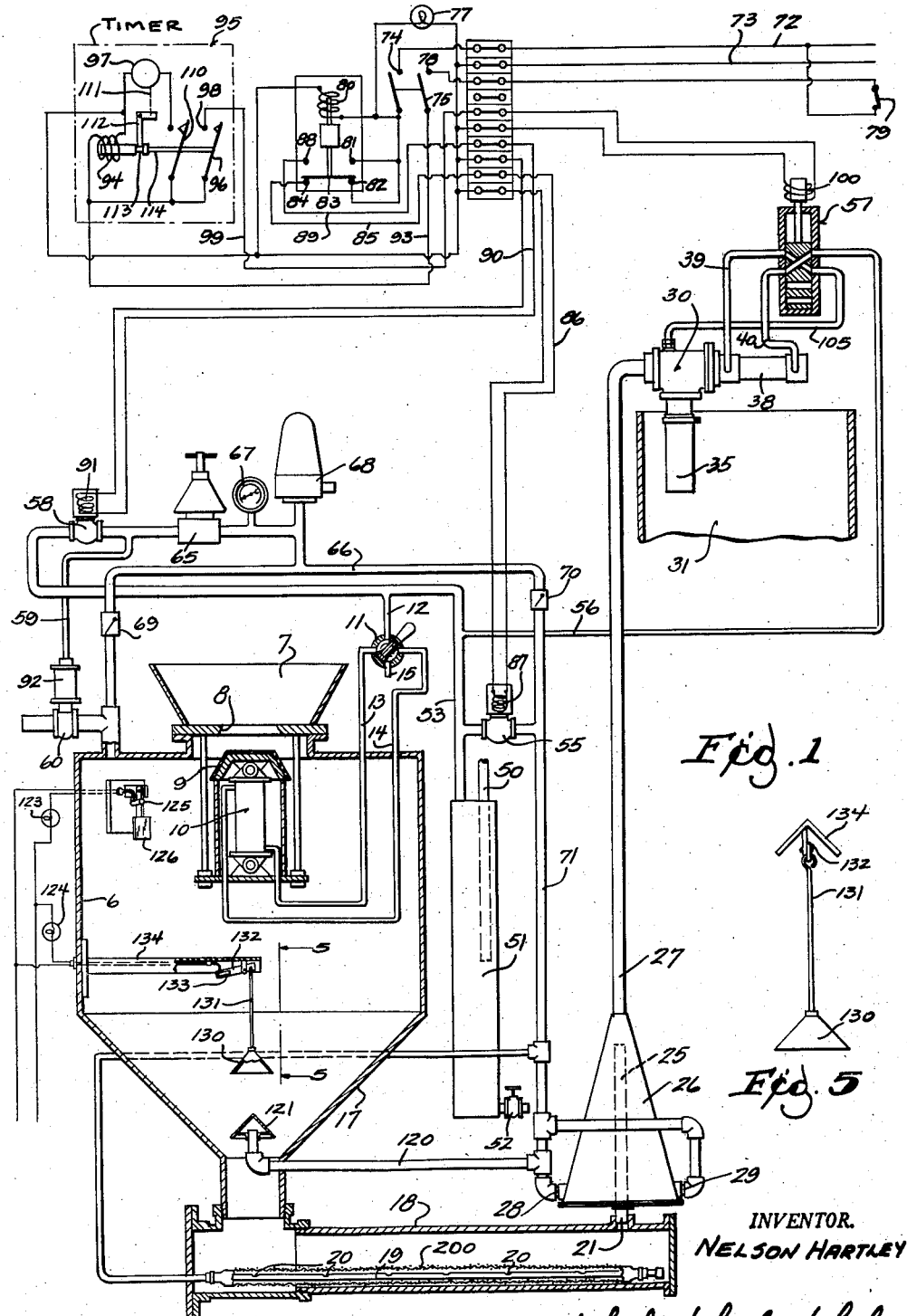

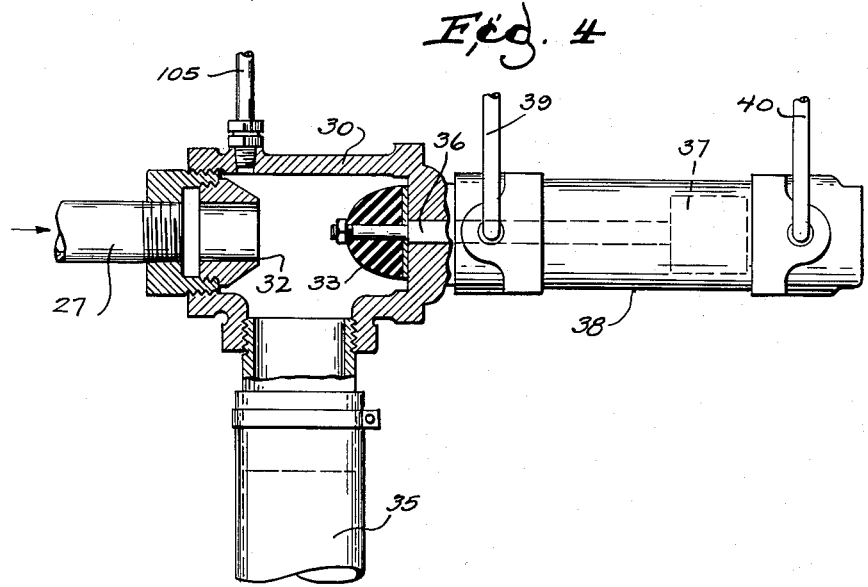
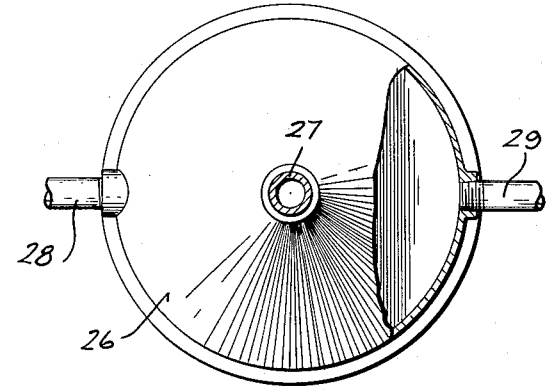
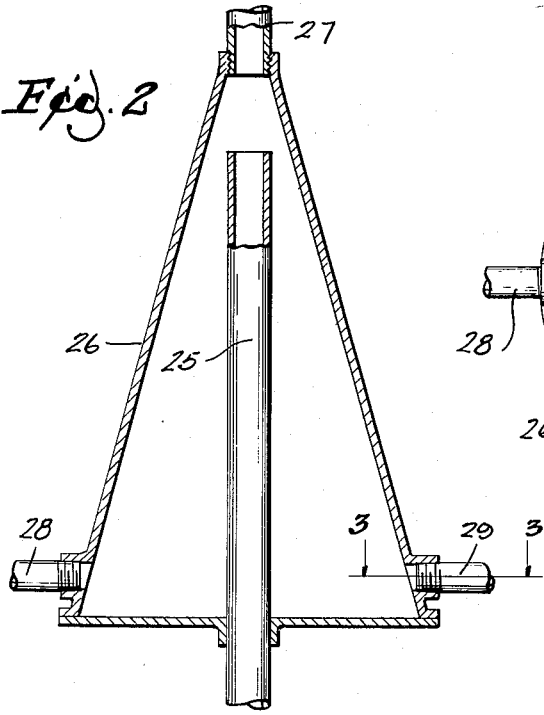
INVENTOR.
NELSON HARTLEY

Nelson Hartley, Baltimore, Md., assignor to Hartley Controls Corporation, Neenah, Wis., a corporation of Wisconsin
Filed Sept. 19, 1956, Ser. No. 610,820
15 Claims. (Cl. 302—53)

This invention relates to the pneumatic delivery and time-controlled measuring of fine material such as powder.

Many attempts have been made to deliver powder pneumatically, but in all instances with which I am familiar, difficulties are encountered after any period of inactivity. In some devices, the powder packs in the delivery system at the conclusion of a single operation.

The present device permits pneumatic delivery of accurately measured charges of powdered material at any desired intervals within the capacity of the device. In other words, delivery may be stopped and resumed at intervals without any packing of the powdered material, the suspension being so accurately uniform that with an ordinary electrical timer or the like it is possible to meter substantially identical successive charges in the successive operations.

In the preferred organization shown, the powder is stored in a tank which is initially under atmospheric pressure or at least at a pressure lower than that used in delivery. The tank is desirably restored to the datum pressure before each subsequent delivery operation. The powder delivery line from the tank leads to an aspirating device comprising a chamber through which a nozzle extends from the tank. From the aspirating device, the pneumatic delivery pipe leads to a valve which has a timer controlling the period for which it remain open.

When pneumatic delivery of material from the tank is called for, the delivery valve opens to release existing pressure and pneumatic fluid is admitted to the aspirating device and to the mixer which intervenes between the tank and the aspirating device. This connection of gas under pressure thoroughly aerates material in the aspirating device and the mixer, thereby placing the powdered material in substantially uniform suspension.

At the beginning of a day's operation, very high pressure may be used for aeration, the gas escaping back through the tank. The duration of back flow of high pressure gas is extremely short and thereupon a delayed action relay energizes connections to close the outlet from the tank and to substitute gas under operating pressure for the high pressure gas. Immediately thereafter the discharge valve is automatically opened for the pneumatic delivery there through of a predetermined quantity of powdered material. This valve then closes subject to the control of the timer. As long as the system remains under pressure, the discharge valve may be opened and closed from time to time to deliver such quantities of powder as may be desired and no stoppage will occur anywhere in the system. Only after the system has been shut down without pressure is it necessary to go through the cycle of back flow of high pressure gas as above described.

In the drawings:

FIG. 1 is a diagrammatic view of the entire apparatus including the circuit and the tank and the valves used, the main storage tank and mixing chamber and some of the valves being shown in section.

FIG. 2 is an enlarged detail view of the aspirating device in transverse section, parts being broken away.

FIG. 3 is a view of the aspirating device in plan, parts being broken away, and its discharge connection being shown in section.

FIG. 4 is an enlarged detail view partially in section and partially in side elevation of the power operated discharge valve.

FIG. 5 is a detail view on an enlarged scale on the line 5—5 of FIG. 1.

Powdered material is stored in the pressure tank 6, being admitted thereto through a port 7 which is surrounded by tapered seat 8 for a rubber-covered, pneumatically-operated valve 9. The ram 10 actuates the valve 9 between its open and closed positions subject to control by means of a manually operated four-way valve at 11 having a pressure connection at 12, lines 13 and 14 leading to opposite ends of the ram cylinder, and a vent at 15.

The hopper bottom 17 of the storage tank 6 discharges into a generally horizontal tubular mixing chamber 18 in the bottom of which is disposed an aerating pipe 19 having numerous orifices at 20 through which pneumatic conveyor gas can be discharged into the contents of the mixing chamber to place the powder therein in suspension. Desirably the apertured pipe 19 is encased in a loosely fittted tube 200 of fabric such as duck which further assists in distributing the conveyor gas in the powder. From the top of the mixing chamber, pipe 21 communicates with the aspirating jet 25, the tube opening centrally into the aspirating chamber 26. This chamber may be of any requisite size or shape, but has been used in the conical form shown, its capacity being made adequate to receive the entire contents of pipe 27 which leads from the top of the chamber. Supply pipes 28 and 29 for pneumatic conveyor gas open into the sides of the chamber. Their connections will be described later.

It will be observed that the aspirating nozzle 25 is directed toward the delivery pipe 27 and spaced only slightly therefrom (FIG. 2). The delivery pipe 27 leads to the point of use of the powder which is conveyed by the system. The powder may, for example, be discharged through pipe 35 opening from the valve 30 into a receiver 31.

The valve 30 (FIG. 4) comprises a seat 32 and a plug 33, desirably elastomeric, mounted on piston rod 36 of piston 37 in ram cylinder 38. Connections are provided at 39 and 40 for admitting operating fluid alternatively to the opposite ends of cylinder 38, whereby the valve 33 may be advanced or retracted as desired.

The air or other pneumatic conveyor fluid is supplied under high pressure through the supply line 50, which leads into the receiver 51 where water and other liquid are trapped subject to being drained off from time to time through the manually controlled valve 52. From the receiver a high pressure line 53 leads the dry gas, first to a bypass solenoid valve 55; secondly via line 56 to a four-way-solenoid valve 57; third to the pipe 12 already referred to as supplying pressure to the manually operable valve 11; and fourth to the solenoid operated valve 58.

When the solenoid valve 58 is open, pressure passed therethrough is communicated through line 59 to close the normally open vent valve 60 which controls the venting of the powder storage chamber 6.

When solenoid valve 58 is open, high pressure air is also admitted to the pressure reducer and regulator 65 through which air at a controllably reduced pressure passes into the line 66. A gauge 67 and safety valve 68 are provided for convenience.

Line 66 communicates through check valve 69 with the storage tank 6. It also communicates through check valve 70 with the pipe 71 to which high pressure air may be admitted through the bypass valve 55. Pipe 71 has branches leading into the aspirating chamber 26 through at least two inlets 28 and 29 at opposite sides thereof.

The system is controlled as follows: Electrical conductors 72, 73 supply line current which will ordinarily be 110 to 115 volts A.C. Conductor 72 is connected to the stationary contact 74 of a double-pole switch 75 across which pilot lamp 77 is desirably connected. The other stationary contact 78 of switch 75 is indirectly connected with conductor 72 through a normally closed switch 79 which may be of the push button type. Opening this switch momentarily will de-energize solenoid 94 to recycle the timer and thereby to cause controlled delivery of powder.

When switch 75 is closed, it serves to connect the line 72 not only to the pilot lamp 77, but to the coil 80 of a delayed action relay. While the precise interval of delay is not critical, it may be noted that in practice I use a relay which has a delay of approximately five seconds in its response. Current from supply conductor 72 is also admitted by switch 75 to the normally open contact 81 of relay 80 as well as to the normally closed contact 82 thereof. From the latter, current passes through the armature-carried movable contact 83 of the relay to contact 84 thereof and thence through conductors 85 and 86 to the coil 87 of the solenoid valve 55. Thus, the closing of switch 75 opens the bypass valve 55 for the period of delay of the relay.

As soon as the relay responds to move its contactor 83 into engagement with its fixed contacts 81 and 88, the circuit to bypass valve 55 is broken and a different circuit is completed through conductors 89 and 90 to the coil 91 of solenoid 58 which admits high pressure gas to the pressure chamber 92 of vent valve 60, and also to the regulator 65 which supplies the low pressure lines as above described.

With switch 75 closed, its contact 78 is dead until normally open switch 79 is momentarily closed. When this happens, current from the conductor 72 passes through the switch to conductor 93 to energize the coil 94 of the interval timer 95. This timer is a well known commercial product which can be set to maintain its switch 96 closed for any desired period. Upon the energization of coil 94, the double-pole switch 96 supplies current concurrently to the motor 97 and to the apparatus controlled by the timer. This latter current is supplied from stationary contact 98 of the timer switch 96 through conductor 99 which leads to the energizing coil 100 of the solenoid operated valve 57, whereby high pressure air supplied through the pipe 56 can be admitted to ducts 39 or 40 alternatively. These ducts lead to opposite ends of the cylinder 38 for the operation of piston 37 to actuate the shut-off valve member 33 as already described. When operating fluid is being supplied to one end of cylinder 38, the other end is vented through the duct 105. Duct 105 is connected into the casing of valve 30 and is directed toward the valve seat 32 to blow away packed powder.

The system as described operates as follows: With valve 11 in the position shown in FIG. 1, the port 7 is open to receive the powdered material. Tank 6 is filled with any desired quantity of the dry powder which is to be metered to the receiver. The position of valve 11 is then reversed to close the plug valve 9 against seat 8, thereby sealing the tank 6. The pressure regulator or reducing valve 65 is then set for an operating pressure predetermined according to the length of the delivery line, the height of vertical lift involved, and the amount of material which must be conveyed pneumatically within the permissible time interval.

The switch 75 is now closed to energize the time delay relay to condition the system for use. This switch will remain closed for the entire period for which the system is in use. Before the time delay mechanism responds, the energization of the relay 83 will communicate current through its normally closed contacts 82, 84 to the coil 87 and the solenoid bypass valve 55, whereby pneumatic fluid under high line pressure will be admitted to pipe 71, whence it will pass through pipes 28 and 29 to the venturi chamber 26. It will also pass through the branch pipe 20 to agitate powdered material in the mixing chamber 18. The normally open vent valve 60 of the tank 6 being open, the gases used for this preliminary aeration of the powdered material will escape to atmosphere from the top of the tank, but the material in the venturi chamber 26, the mixing chamber 18 and the tank 6 will be violently agitated and all, or a substantial part thereof, will be thrown into suspension.

As above stated, the time mechanism of the relay will only defer movement of the contact 83 for a few seconds, following which the contactor 83 will open the circuit between contacts 82 and 84, thereby permitting the bypass valve 55 to close, and closing the alternative circuit between fixed contacts 81 and 88 of the relay to open solenoid valve 58. This closes the vent valve 60 and supplies pneumatic conveyor gas at a pressure controlled by regulator 65 to pipe 66 whence it enters tank 6 through check valve 69 and enters pipe 71 through check valve 70. The system is now under operating pressure.

When there is a demand for the delivery of powder through the valve 30, 33 into the receiver 31, the switch 79 is closed either manually or through other apparatus. This supplies current through the contact 78 of the main switch 75 to energize the timer motor 97 and relay coil 94. The closing of the relay contactor 110 sets up a holding circuit for the motor and the closing of relay contact 96 to contact 98 energizes coil 100 of the solenoid valve 101 to open the valve plug 33 to permit pneumatic discharge of material into the receiver.

At the conclusion of the interval for which the timer is set, the motor 97 opens the relay contacts 96 and 110. This is conveniently done mechanically through connections diagrammatically illustrated by the dotted line 111 from the motor 97 to the bell crank 112, which is engaged with collar 113 on the armature 114 to shift the armature against the bias of solenoid 94, thereby breaking the circuit to the clock motor and contact 98. Solenoid 94 will remain energized until the control switch 79 is reopened. This causes an immediate movement of the solenoid valve 101 to the position shown in FIG. 1, whereby fluid admitted to the cylinder 38 immediately presses valve plug 33 to seat 32 thereby shutting off the delivery of material into the receiver.

At the conclusion of the delivery cycle, so long as the system remains under pressure, the material remains so thoroughly serated and in suspension that at no time is any part of the system filled solidly with the powder to be conveyed. This is a very important feature of the invention as it prevents the dry powder from packing, which it otherwise will do, notwithstanding that it is dry.

Switch 79 being normally open, the system will remain at rest until there is a further demand for powder delivery.

When switch 79 is closed, it will be noted that the delivery valve comprising the rubber plug 33 will concurrently be opened to relieve the pressure in the system at the delivery end. The flow of powder from the discharge pipe 35 commences at once and is uniform for each unit of time that the valve remains open. This evidences the fact that throughout the system the powder has remained aerated and in condition to flow freely as soon as the discharge valve opens.

A surprising result is the fact that identical amounts of powder will be delivered into the receiver 31 in each successive cycle of operation. In other words, the time-controlled flow at a given pressure will always deliver an identical quantity of material in a given period of time. The amount delivered will vary directly with the time for which the valve 30, 33 is maintained open by the motor 97 of the timer.

Among the numerous uses to which the apparatus can be put is the delivery of foundry sand additive into a mixer. The additive may comprise wood flour or any one of a number of other materials, some of which use wood flour as a base. This flour is so light that it is very difficult to measure speedily with accuracy by any known means. Yet the pneumatic time-controlled device herein disclosed will deliver identical quantities as often as demand recurs during the working period.

It is, of course, desirable that at the conclusion of any given working period, the main switch 75 be opened and the tank 6 vented, as by opening the filler plug valve 9 so that, as the commencement of the next working period, the closing of this switch will subject the entire system to a powerful blast of the pneumatic conveyor gases under full line pressure. These will blow back through the tank 6, thereby aerating it, and accomplishing results not required between successive cycles during normal routine operation. In addition to the admission of high pressure air to the mixing chamber 18, I may provide a branch pipe 120 leading to the bottom of the hopper 17 and having its outlet protected from descending powder by means of the conical cap 121. Air discharged from beneath the cap is directed along the conical side walls of the hopper, tending to keep these free of accumulations of powder.

It is desirable that the operator have means of knowing when the hopper 6 has been adequately filled with powder and when the powder level therein is so low as to require replacement in the near future. This can readily be accomplished by pilot lights 123 and 124. The light 123 is controlled by a switch 125 which may be a mercury switch actuated by the paddle 126. Whenever the powder in the hopper rises sufficiently to engage the paddle, its outward pressure on the paddle will tilt the paddle to close switch 125, thereby illuminating lamp 123. The purpose of this is to keep the hopper from getting so full that the plug valve 9 will not seat properly.

Powder entering the hopper and flowing toward the bottom thereof will fall onto a suspended baffle 130 which is connected by link 131 with a pivotally mounted lever 132 on which the mercury switch 133 is mounted. The arm 134 which carries these parts from the wall of hopper 6 desirably comprises an inverted angle iron which protects the switch and the lever 133 from direct engagement by the powder. The switch 133 is normally closed to energize the lamp 124. As soon as powder falls about the baffle 130, the weight of the powder maintains the baffle in its lowermost position, thereby opening switch 133 and extinguishing the lamp 124. As long as the adequate supply of powder remains in the hopper, the lamp 124 will remain extinguished. As soon as the level of powder falls below baffle 130 the powder will slide from the conically-shaped baffle and the lever 132, relieved of the weight of the powder, will swing to the positions shown in FIG. 1 to close the switch 133 and energize the lamp 124 for the purpose of signaling that further powder is needed in the hopper.

It will be observed that in addition to the mechanics of the system as herein disclosed, there has been disclosed a method capable of being performed manually, the steps involved including the establishment of a pressure differential to occasion flow of gas, the material being desirably preliminarily subjected to gas under substantial pressure. The gas flow is so directed through the material as to induce turbulence which places the material in suspension and in substantially uniform dispersion in the gas, whereby, upon the discharge of the gas and suspended material under uniform conditions, a given amount of material will always be discharged in a given length of time.

I claim:

1. In a pneumatic delivery system, the combination with means for storing powdered material for pneumatic delivery, of pneumatic connections from said storage means including an aspirating chamber, a nozzle communicating with the storage means and opening into said chamber, a delivery pipe from the chamber provided with a discharge controlling valve, and means effective upon the opening of said valve for dispersing powdered material in the gas in said aspirating chamber, the pipe leading from said chamber extending in an upward direction and said chamber having sufficient capacity to receive substantially all powdered material falling in said pipe upon cessation of pneumatic flow.

2. In a pneumatic delivery system, the combination with means for storing powdered material for pneumatic delivery, of pneumatic connections from said storage means including an aspirating chamber, a nozzle communicating with the storage means and opening into said chamber, a delivery pipe from the chamber provided with a discharge controlling valve, and means effective upon the opening of said valve for dispersing powdered material in the gas in said aspirating chamber, said aspirating chamber having substantial powder storage capacity below said nozzle, together with high pressure gas connections opening into said chamber and provided with a control valve whereby powdered material standing for a long time in said chamber can be dispersed under a high pressure preliminary to the normal dispersion incident to the establishment of a convection current.

3. The device of claim 2 in which the storage means is provided with valve means normally closed and with a vent valve, said vent valve being open during the opening of the valve means first mentioned to supply high pressure gases to the aspirating chamber as aforesaid, whereby relief of high pressure in the aspirating chamber occurs through the storage means and reversely to the direction of pneumatic delivery, and means for closing said vent valve for maintaining pressure in said storage means.

4. The combination with a storage hopper having a normally closed loading valve and a vent valve, of an aspirating chamber provided with a delivery pipe and a nozzle terminating near and directed toward said pipe, valve means controlling flow from the pipe, a gas supplying connection to the aspirating chamber for dispersing material therein for pneumatic convection through said pipe, a low pressure line normally communicating with said connection, a high pressure line potentially communicating with such connection and having a normally closed bypass valve controlling such potential communication, and means for opening the valve last mentioned and the vent valve from said hopper for dispersing powered material into the aspirating chamber and relieving pressure therein backwardly through said hopper and said vant valve, said last mentioned means being adapted to close the vent valve subsequent to the closing of the bypass valve which controls the admission of high pressure gases to the aspirating chamber.

5. The device of claim 4 in which a mixing chamber provides a communication between the storage hopper and the aspirating chamber, said mixing chamber extending in a generally horizontal direction and being provided along its bottom with an air supply pipe communicating with the pressure connections aforesaid and having openings into the mixing chamber for the aeration of powdered material therein.

6. The device of claim 4 in which the pipe from the aspirating chamber leads upwardly therefrom, the aspirating chamber having a sufficient capacity about said nozzle to receive powdered material settling by gravity from said pipe during intervals between pneumatic convection.

7. The device of claim 4 in which the discharge valve is provided with an interval timer having operative connections for determining the duration of periods of valve opening.

8. The device of claim 4 in further combination with a valve and pressure reducer for admitting high pressure gases to the low pressure connections aforesaid together with electromagnetic operating means of the several valves, and a control system including a main switch, a time delay relay having a first set of contacts normally closed to open the bypass valve upon the closing of the main switch, said time delay relay having further contacts and further connections whereby, upon the response of said relay, and the closing of the bypass valve, the valve controlling the admission of high pressure air to the low pressure connection is opened and the vent valve closed, together with a timer and a control switch for energizing controls of the discharge valve to said timer with the opening of the discharge valve for a predetermined period controlled by the timer and subsequent closing thereof, low pressure gas being admitted to the aspirating chamber during the period of such discharge valve opening.

9. The device of claim 4 in further combination with a pipe controlled by said bypass valve and leading into the bottom of the storage hopper and having means directing discharge from said pipe along the walls of said hopper.

10. The device of claim 4 in further combination with means for indicating levels of powder in the hopper.

11. The device of claim 10 in which said indicating means includes a balanced normally closed switch, a pilot light and a baffle connected with said switch and exposed to the weight of material in the hopper and opening said switch as long as the weight of material on said baffle is adequate, said switch being self-closing when the weight of material on the baffle becomes inadequate.

12. Apparatus for delivering accurately measured amounts of finely divided powdered material and comprising a closed powder storage system including a powder container and a delivery pipe extending from said container to a remote point of powder discharge, gas pressure means to uniformly disperse powder in suspension in gas throughout said system including said discharge pipe, a valve at the discharge end of said delivery pipe, timer means for controlling the period that the valve remains open and means for selectively opening said valve for predetermined timed intervals for discharging substantially equal amounts of powder in each said interval, said powder remaining under pressure and in suspension throughout said system including said discharge pipe when the valve is closed and in continued readiness for fluidized discharge from the discharge end of the pipe when said valve is opened.

13. The apparatus of claim 12 in which said gas pressure means comprises first means to initially uniformly disperse said powder in suspension in said gas and second means including a pressure regulator for the automatic periodic admission into and circulation within said container of gas under a predetermined pressure.

14. The device of claim 13 in which said first means comprises means for introducing gas into the container under a pressure higher than that for which the pressure regulator is set.

15. The device of claim 13 in further combination with means to vent the container to the atmosphere during said initial introduction of higher pressure gas and to close said vent thereafter.

References Cited in the file of this patent

UNITED STATES PATENTS

| | | |
|---|---|---|
| 1,669,084 | Grindle | May 8, 1928 |
| 1,935,843 | Goebels | Nov. 21, 1933 |
| 2,027,697 | Nielsen | Jan. 14, 1936 |
| 2,032,367 | Kennedy | Mar. 3, 1936 |
| 2,128,252 | Johnson | Aug. 30, 1938 |
| 2,372,343 | Smith | Mar. 27, 1945 |
| 2,380,651 | Jeffery | July 31, 1945 |
| 2,544,210 | Zenke | Mar. 6, 1951 |
| 2,608,446 | La Pota | Aug. 26, 1952 |
| 2,696,933 | Barclay | Dec. 14, 1954 |
| 2,758,564 | Randall | Aug. 14, 1956 |

UNITED STATES PATENT OFFICE
CERTIFICATE OF CORRECTION

Patent No. 2,989,349                                    June 20, 1961

Nelson Hartley

It is hereby certified that error appears in the above numbered patent requiring correction and that the said Letters Patent should read as corrected below.

Column 4, line 47, for "serated" read -- aerated --; column 5, line 9, for "as" read -- at --; column 6, line 44, for "powered" read -- powdered --; line 46, for "vant" read -- vent --.

Signed and sealed this 7th day of November 1961.

(SEAL)
Attest:

ERNEST W. SWIDER                                    DAVID L. LADD
Attesting Officer                                      Commissioner of Patents